(12) United States Patent
Goddard et al.

(10) Patent No.: US 12,106,118 B2
(45) Date of Patent: *Oct. 1, 2024

(54) SYSTEM FOR AUTOMATICALLY GENERATING ELECTRONIC ARTIFACTS USING EXTENDED FUNCTIONALITY

(71) Applicant: BANK OF AMERICA CORPORATION, Charlotte, NC (US)

(72) Inventors: Douglas James Goddard, McKinney, TX (US); Sujit Kumar, Plano, TX (US); Patrick Edward Neal, Frisco, TX (US); Paul Eric Hazboun, Mound, TX (US); Juvenita Sheela Jothi Santha Kumar, Carrollton, TX (US); Ananth M. Padmanabhan, Wilmington, DE (US); George Wesley Cleveland, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,664

(22) Filed: Nov. 7, 2023

(65) Prior Publication Data

US 2024/0069924 A1 Feb. 29, 2024

Related U.S. Application Data

(63) Continuation of application No. 17/090,255, filed on Nov. 5, 2020, now Pat. No. 11,880,693.

(51) Int. Cl.
G06F 9/44 (2018.01)
G06F 8/30 (2018.01)
G06F 9/445 (2018.01)

(52) U.S. Cl.
CPC ............... *G06F 9/445* (2013.01); *G06F 8/30* (2013.01)

(58) Field of Classification Search
CPC .................................. G06F 9/445; G06F 8/30
See application file for complete search history.

(56) References Cited

U.S. PATENT DOCUMENTS

| | | |
|---|---|---|
| 9,930,172 B2 | 3/2018 | Hodge |
| 10,028,646 B2 | 7/2018 | Gazdzinski |
| 10,270,896 B2 | 4/2019 | Rhoads |
| 10,496,384 B2 | 12/2019 | Kulkarni |
| 10,560,579 B1 | 2/2020 | Wu |
| 10,623,443 B2 | 4/2020 | Lang |

(Continued)

*Primary Examiner* — Hang Pan
(74) *Attorney, Agent, or Firm* — Moore & Van Allen PLLC; Seongun M. Hong

(57) ABSTRACT

A system is provided for automatically generating electronic artifacts using extended functionality. In particular, the system may use a template-based process to automatically generate artifacts based on a defined set of parameters and/or variables. The system may further use one or more plugins which may provide extended functionality with respect to the artifact generation process. Accordingly, the artifact generation process may include initializing a parameter list based on application parameters and/or plugin parameters, processing the parameters, generating variables based on the parameters, and replacing variables in scheme template files with appropriate values (e.g., user supplied or plugin generated values) to output an artifact file to a predetermined location. In this way, the system provides a robust and efficient way to automatically generate artifacts.

20 Claims, 2 Drawing Sheets

(56) References Cited

U.S. PATENT DOCUMENTS

| | | |
|---|---|---|
| 10,705,812 B2 | 7/2020 | Seetharaman |
| 10,757,000 B2 | 8/2020 | Gelvin |
| 10,880,322 B1 | 12/2020 | Jakobsson |
| 11,023,301 B1 | 6/2021 | Hornbeck |
| 11,282,612 B2 | 3/2022 | Lombardi |
| 11,461,311 B2 | 10/2022 | Rodrigues |
| 11,474,872 B2 | 10/2022 | Vassenkov |
| 11,552,996 B2 | 1/2023 | Lang |
| 11,715,473 B2 | 8/2023 | Rodriguez |
| 11,816,455 B2 | 11/2023 | Bodin |
| 11,839,781 B1 | 12/2023 | Dashevsky |
| 11,849,196 B2 | 12/2023 | Parmar |
| 2021/0058395 A1 | 2/2021 | Jakobsson |
| 2021/0281928 A1 | 9/2021 | Boskovich |
| 2021/0385278 A1 | 12/2021 | Binder |

200

```
EXECUTE A PARAMETER INITIALIZATION PROCESS COMPRISING: 1) READING ONE OR
MORE PARAMETERS FROM ONE OR MORE PROPERTIES FILES; AND 2) GENERATING A
PARAMETER LIST COMPRISING THE ONE OR MORE PARAMETERS
201
```

```
EXECUTE A PARAMETER-BASED VARIABLE GENERATION PROCESS COMPRISING,
BASED ON THE ONE OR MORE PARAMETERS WITHIN THE PARAMETER LIST,
GENERATING A VARIABLE LIST COMPRISING ONE OR MORE VARIABLES ASSOCIATED
WITH THE ONE OR MORE PARAMETERS AND ONE OR MORE VALUES ASSOCIATED
WITH THE ONE OR MORE VARIABLES
202
```

```
EXECUTE A PLUGIN-BASED VARIABLE GENERATION PROCESS COMPRISING: 1)
LOADING ONE OR MORE PLUGINS INTO THE MEMORY, THE ONE OR MORE PLUGINS
COMPRISING ONE OR MORE PLUGIN VARIABLES; AND 2) APPENDING THE ONE OR
MORE PLUGIN VARIABLES TO THE VARIABLE LIST
203
```

```
BASED ON THE PARAMETER LIST AND VARIABLE LIST, INITIATE AN ARTIFACT
GENERATION PROCESS COMPRISING: 1) LOADING A TEMPLATE FILE INTO THE
MEMORY; 2) DETECTING ONE OR MORE VARIABLE NAMES WITHIN THE TEMPLATE FILE;
3) CORRELATING THE ONE OR MORE VARIABLE NAMES WITH THE ONE OR MORE
VARIABLES IN THE VARIABLE LIST; 4) REPLACING THE ONE OR MORE VARIABLE
NAMES WITH THE ONE OR MORE VALUES ASSOCIATED WITH THE ONE OR MORE
VARIABLES; AND 5) GENERATING A DATABASE ARTIFACT BASED ON THE TEMPLATE
FILE
204
```

FIG. 2

SYSTEM FOR AUTOMATICALLY GENERATING ELECTRONIC ARTIFACTS USING EXTENDED FUNCTIONALITY

CROSS-REFERENCE TO RELATED APPLICATIONS

This application is a continuation application of and claims priority to U.S. patent application Ser. No. 17/090,255 filed on Nov. 5, 2020, and of the same title; the contents of which are also incorporated herein by reference.

FIELD OF THE INVENTION

The present disclosure embraces a system for automatically generating electronic artifacts using extended functionality.

BACKGROUND

There is a need for a way to expediently and efficiently generate artifacts.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for automatically generating electronic artifacts using extended functionality. In particular, the system may use a template-based process to automatically generate artifacts based on a defined set of parameters and/or variables. The system may further use one or more plugins which may provide extended functionality with respect to the artifact generation process. Accordingly, the artifact generation process may include initializing a parameter list based on application parameters and/or plugin parameters, processing the parameters, generating variables based on the parameters, and replacing variables in scheme template files with appropriate values (e.g., user supplied or plugin generated values) to output an artifact file to a predetermined location. In this way, the system provides a robust and efficient way to automatically generate artifacts.

Accordingly, embodiments of the present disclosure provide a system for automatically generating electronic artifacts using extended functionality. The system may comprise a memory device with computer-readable program code stored thereon; a communication device; and a processing device operatively coupled to the memory device and the communication device, wherein the processing device is configured to execute the computer-readable program code to execute a parameter initialization process, the parameter initialization process comprising: reading one or more parameters from one or more properties files; and generating a parameter list comprising the one or more parameters; execute a parameter-based variable generation process, the parameter-based variable generation process comprising, based on the one or more parameters within the parameter list, generating a variable pool comprising one or more variables associated with the one or more parameters and one or more values associated with the one or more variables; execute a plugin-based variable generation process, the plugin-based variable generation process comprising: loading one or more plugins into the memory device, the one or more plugins comprising one or more plugin variables; and appending the one or more plugin variables to the variable pool; and based on the parameter list and variable pool, initiate an artifact generation process.

In some embodiments, the artifact generation process comprises loading a template file into the memory device; detecting one or more variable names within the template file; correlating the one or more variables names with the one or more variables in the variable pool; replacing the one or more variable names with the one or more values associated with the one or more variables; and generating an artifact based on the template file.

In some embodiments, the parameter initialization process further comprises reading one or more command line parameters from a command line; and appending the one or more command line parameters to the parameter list.

In some embodiments, the parameter initialization process further comprises reading one or more preset system parameters from one or more configuration files; and appending the one or more preset system parameters to the parameter list.

In some embodiments, the parameter-based variable generation process comprises detecting an unset value for a variable of the one or more variables; and setting a preset value for the variable.

In some embodiments, the parameter-based variable generation process comprises detecting conditional logic within a template file; and generate a variable according to the conditional logic.

In some embodiments, the one or more variables comprises at least one of a table name, table description, column descriptions, and column types.

Embodiments of the present disclosure also provide a computer program product for automatically generating electronic artifacts using extended functionality. The computer program product may comprise at least one non-transitory computer readable medium having computer-readable program code portions embodied therein, the computer-readable program code portions comprising executable code portions for executing a parameter initialization process, the parameter initialization process comprising: reading one or more parameters from one or more properties files; and generating a parameter list comprising the one or more parameters; executing a parameter-based variable generation process, the parameter-based variable generation process comprising, based on the one or more parameters within the parameter list, generating a variable pool comprising one or more variables associated with the one or more parameters and one or more values associated with the one or more variables; executing a plugin-based variable generation process, the plugin-based variable generation process comprising: loading one or more plugins into a memory device, the one or more plugins comprising one or more plugin variables; and appending the one or more plugin variables to the variable pool; and based on the parameter list and variable pool, initiating an artifact generation process.

In some embodiments, the artifact generation process comprises loading a template file into the memory device; detecting one or more variable names within the template file; correlating the one or more variables names with the one or more variables in the variable pool; replacing the one or more variable names with the one or more values associated with the one or more variables; and generating an artifact based on the template file.

In some embodiments, the parameter initialization process further comprises reading one or more command line parameters from a command line; and appending the one or more command line parameters to the parameter list.

In some embodiments, the parameter initialization process further comprises reading one or more preset system parameters from one or more configuration files; and appending the one or more preset system parameters to the parameter list.

In some embodiments, the parameter-based variable generation process comprises detecting an unset value for a variable of the one or more variables; and setting a preset value for the variable.

In some embodiments, the parameter-based variable generation process comprises detecting conditional logic within a template file; and generate a variable according to the conditional logic.

Embodiments from the present disclosure also provide a computer-implemented method for automatically generating electronic artifacts using extended functionality, wherein the computer-implemented method comprises executing a parameter initialization process, the parameter initialization process comprising: reading one or more parameters from one or more properties files; and generating a parameter list comprising the one or more parameters; executing a parameter-based variable generation process, the parameter-based variable generation process comprising, based on the one or more parameters within the parameter list, generating a variable pool comprising one or more variables associated with the one or more parameters and one or more values associated with the one or more variables; executing a plugin-based variable generation process, the plugin-based variable generation process comprising: loading one or more plugins into a memory device, the one or more plugins comprising one or more plugin variables; and appending the one or more plugin variables to the variable pool; and based on the parameter list and variable pool, initiating an artifact generation process.

In some embodiments, the artifact generation process comprises loading a template file into the memory device; detecting one or more variable names within the template file; correlating the one or more variables names with the one or more variables in the variable pool; replacing the one or more variable names with the one or more values associated with the one or more variables; and generating an artifact based on the template file.

In some embodiments, the parameter initialization process further comprises reading one or more command line parameters from a command line; and appending the one or more command line parameters to the parameter list.

In some embodiments, the parameter initialization process further comprises reading one or more preset system parameters from one or more configuration files; and appending the one or more preset system parameters to the parameter list.

In some embodiments, the parameter-based variable generation process comprises detecting an unset value for a variable of the one or more variables; and setting a preset value for the variable.

In some embodiments, the parameter-based variable generation process comprises detecting conditional logic within a template file; and generate a variable according to the conditional logic.

In some embodiments, one or more plugins may be configured to generate one or more variables comprising at least one of a table name, table description, column descriptions, and column types. In other embodiments, a plugin related to automated job creation may be configured to generate variables related to jobs and/or the job creation process, such as job components, breakdowns of job names, and the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
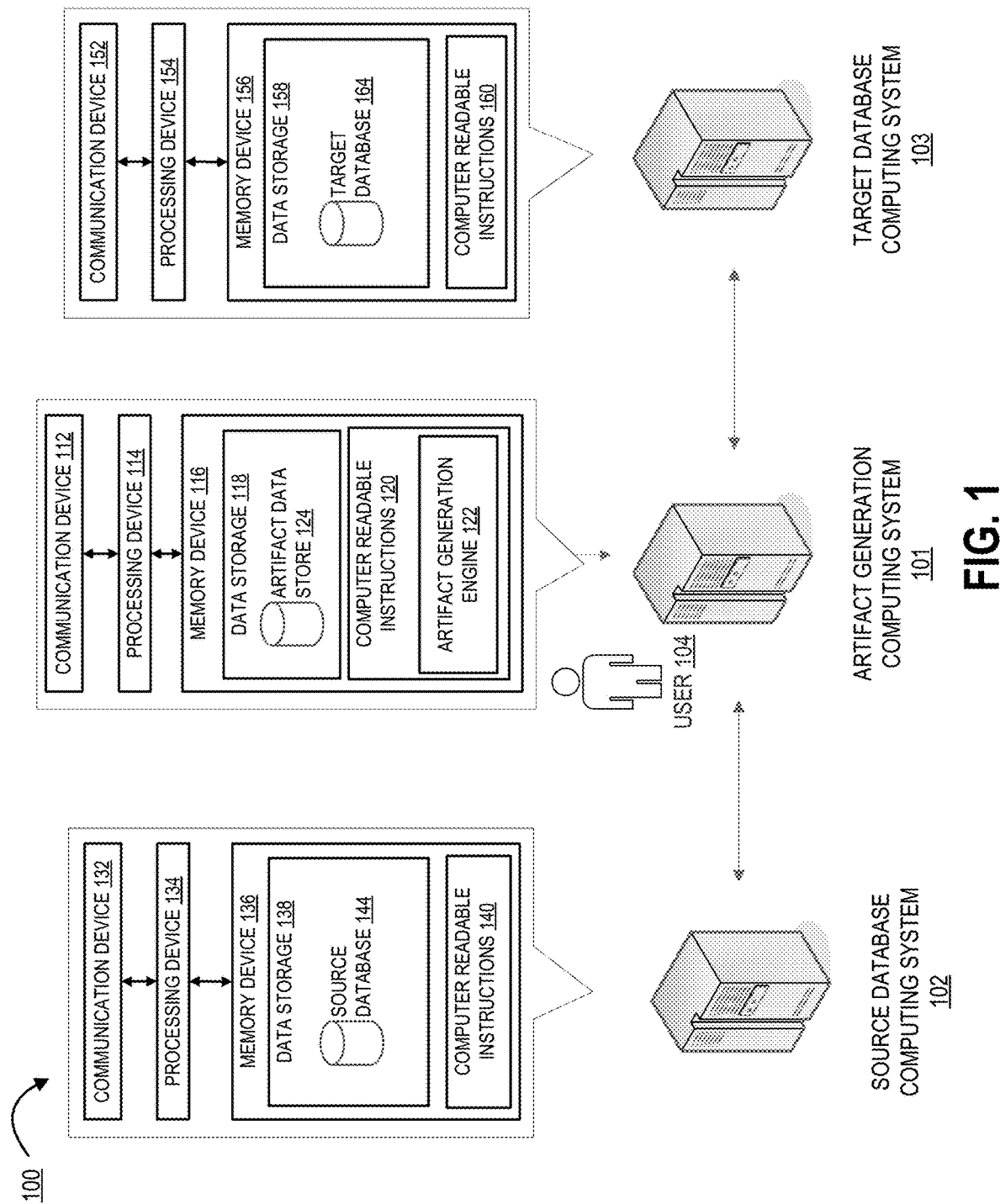

Having thus described embodiments of the invention in general terms, reference will now be made to the accompanying drawings, wherein:

FIG. 1 illustrates an operating environment for the artifact generation system, in accordance with one embodiment of the present disclosure; and FIG. 2 illustrates a process flow for automatically generating artifacts, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" as used herein may refer to a computing system that may be operated by the user, such as a desktop computer or workstation, laptop computer, or the like.

"Artifact" as used herein may refer to data and/or data files that may be generated as a product of the artifact generation process as described herein. For instance, in one embodiment, the generated artifacts may be related to or associated with databases. Such artifacts may be referred to herein as "database artifacts." In such embodiments, artifacts may define how a certain database is organized or structured, how data is stored within the database, what calculations are performed on the data within the database, and the like. Accordingly, examples of such artifacts may include configuration files, data definition files, scripts or jobs to be executed and/or installed, or the like. In other embodiments, the artifacts may comprise computer-executable code and/or programs that may perform one or more specified functions (e.g., scheduling code, various application code components, data store attributes/metadata such as names, data store object creation scripts, data type translations, and the like). In yet other embodiments, the artifacts may comprise communications to a user. Accordingly, it should be understood that examples provided herein are for illustrative purposes only and are not intended to limit the scope of the types or uses of the artifacts that may be generated through the artifact generation process.

"Parameter" as used herein may refer to a data value that may relate to an artifact and/or the generation of said artifact. Examples of parameters may include, the names of files to be loaded during the artifact generation process, values for project name, release name, or the like. In some embodiments, a particular parameter may be associated with a variable, where "variable" as used herein may refer to a data value that may be changed during the artifact generation process. In this regard, a particular parameter may specify that its value should be stored within a particular variable.

"Templates" or "scheme templates" as used herein may refer to data files containing presets for defining content, format, and/or other characteristics of an artifact to be generated. For example, a template may contain presets for formatting data within the database (e.g., within a table). In this regard, each template may comprise one or more variables that may be replaced with generated values depending on the artifact to be generated. Templates may be user-defined to extend the functionality of the artifact generation engine according to the needs of the project and/or the artifact to be generated. "Scheme" as used herein may refer to a grouping of templates. For instance, in some embodiments, a scheme may be one or more folders and/or subfolders containing template files to be used in the artifact generation process.

"Plugin" as used herein may refer to a selectable and/or swappable module that may extend the functionality of the system as described herein. In this regard, plugins may comprise properties files that may identify or define parameters, configuration files containing parameters, instructions for processing parameters and/or generating variables, instructions for selecting templates and/or performing certain functions and/or processes with respect to a particular template, and the like. In some embodiments, plugins may further comprise executable code and/or instructions to provide extended functionality to the artifact generation engine. For instance, such executable code may contain conditional logic (e.g., if X, then Y) or additional functions that may be absent from the core artifact generation engine (e.g., a number random generator).

An entity system may comprise a plurality of databases containing tables and artifacts associated with each of the tables. In certain scenarios, it may be desirable to automatically generate the artifacts needed to populate the tables (e.g., during table migration from one platform to another). Accordingly, embodiments of the present disclosure provide a system for automatically generating electronic artifacts using extended functionality. In this regard, the system may comprise an artifact generation engine which may use templates in conjunction with plugins to retrieve the necessary parameters, generate the necessary variables, and generate artifacts by replacing designated fields or values within each template with the generated variables. By using plugins, the system may provide a scalable and flexible way to define new variables, provide extended functionality to the core artifact generation engine, and the like.

The artifact generation process may begin with a parameter initialization process through which parameters may be identified from various sources within the network environment and added to a parameter list. For instance, in addition to the parameters that may be built into the artifact generation engine itself, the artifact generation engine may further be configured to read one or more properties files, each of which may contain various types of data and/or metadata regarding parameters to be initialized. In this regard, such data and/or metadata regarding the parameters may include parameter definitions, variable names, preset values, parameter descriptions, relevant plugins and/or schemes, project names, and the like. Such properties files may be generated, for instance, based on parameters defined according to a particular application in use within the network environment. In some embodiments, the parameter initialization process may further comprise the artifact generation engine reading parameters from various plugins and/or command line parameters, and subsequently adding said parameters to the parameter list. For instance, the artifact generation engine may read plugin properties files to initialize the plugin parameters.

In other embodiments, a configuration file may contain a line that calls for the artifact generation engine to pull parameters from a specified plugin. In this regard, a line that reads "p=plugin" may define the "plugin" parameter. Subsequently, a line that reads "-p XYZ" may cause the artifact generation engine to recognize a plugin named "XYZ" and pull the parameters associated with the XYZ plugin.

Each properties file may be a text file including one or more lines for each parameter defined. In an exemplary embodiment, a properties file may contain a parameter definition line which reads "c=config" which defines the "config" parameter. Subsequently, when the artifact generation engine encounters a parameter specification line that reads "-c ABC" during the parameter processing phase, the artifact generation engine may recognize "ABC" as the name of a configuration file and thereafter process the "ABC" configuration file. Said properties file may further contain a line which reads "u=%genuser%" that specifies that "%genuser% is a variable name as denoted by a variable notation (e.g., percent symbols). Subsequently, if the artifact generation engine encounters a line that reads "-u 123" during the parameter processing phase, the artifact generation engine may recognize "123" as a value that is to be stored in the "%genuser%" variable. In this way, a properties file may define parameters by assigning values and/or associating the parameters with certain variables used in the artifact generation process.

In some embodiments, the artifact generation engine may further initiate a variable generation process concurrently with the parameter initialization process. In this regard, one parameter may specify a value for a variable while the next parameter may specify a plugin to be used, which in turn causes said plugin to be called to define plugin parameters associated with said plugin.

In some embodiments, the artifact generation engine may populate the variable pool based on one or more configuration files, where the configuration files may be text files comprising one or more parameters along with their associated values and/or variables. Continuing the above example, a configuration file may include an entry that reads "-u ABC" which specifies that user ID "ABC" is to be stored in the %genuser% variable as defined above in a properties file. In some embodiments, the artifact generation engine may further use variables generated by one or more plugins. In this regard, once all parameters have been processed, the artifact generation engine may call one or more plugins to generate plugin-specific variables. In some embodiments, the variable generation process may further comprise setting preset values for any parameters that have not been assigned a value. In other embodiments, the artifact generation engine may detect that a particular variable that has been defined as "required" does not have a value associated with said variable. In such scenarios, the artifact generation engine may terminate the artifact generation process.

Upon detecting that the parameters have been initialized and the variables have been generated, the artifact generation engine may generate the artifact. In this regard, the artifact generation engine may read all of the template files existing within a scheme folder and/or subfolder and replace the variables within each template file with the appropriate values generated during the variable generation process. The variable replacement process may comprise the artifact generation engine scanning each template file to identify the variable names (e.g., %genuser%), searching for the variable names within the variable pool, and replacing the variable name in the template file with the variable's value as defined in the variable pool.

In some embodiments, the artifact generation engine may support conditional generation of artifacts. In this regard, the artifact generation engine may be configured to recognize conditional operators (e.g., IF, ELSE, FOR, and the like). In an exemplary embodiment, a template file may conditionally generate an artifact according to a first set of code upon detecting that user ABC has initiated the artifact generation process (e.g., %IF% %genuser%=="ABC"), while generating the artifact according to a second set of code upon detecting that a user other than ABC has initiated the artifact generation process (e.g., %ELSE%), where the first set of code and second set of code may be separated by conditional operators IF and ELSE.

In some embodiments, a template file may comprise an ITERATE operator which may cause the artifact generation engine to iterate through list variables. "List variable" as used herein may refer to a variable comprising a list of values associated with said variable (e.g., the list variable USERNAME may comprise a list of values for usernames). In this regard, an iterative process may be executed for each element classified under a particular variable name. To illustrate, the list variables %CLIENTNAME%, %CLIENTADDRESS%, %CLIENTCITY%, %CLIENTSTATE%, and %CLIENTZIPCODE% may be associated the variable %CLIENTS%, where the %CLIENTS% variable may be defined as an index for said list variables. Each list variable may contain 10 values (e.g., %CLIENTCITY% may contain 10 values for city names).

If ITERATE is called with respect to a particular list variable (e.g., %CLIENTNAME%), the artifact generation engine may iterate over the number of values within the specified list variable (e.g., 10 times in the foregoing example) such that the nth value within the list variable will be made available for variable substitution. On the other hand, if ITERATE is called with respect to an index (e.g., %CLIENTS%), the iterative process will be executed for each of the list variables associated with the index according to the number of values within the list variables. For instance, if each list variable contains 10 values, the iterative process will be executed 10 times such that the 5 list variables associated with %CLIENTS% will have their respective nth values made available for variable substitution.

The artifact generation engine may further be configured to recognize other types of commands from template files. For instance, the SET command may be used to define new variables and set variable values, whereas the UNSET command may be used to remove variables defined by the SET command. The COUNT function may return the number of elements associated with a particular variable name. For instance, if there are three elements associated with variable %INDEXNAME%, then the COUNT function will return the value "3" when called with respect to %INDEXNAME%. The DEFINED function may return a 0 or 1 (e.g., FALSE OR TRUE) to indicate whether a particular variable has been defined. The EXTRACT and REPLACE functions may allow for a portion of a variable's value to be output and/or replaced. It should be understood that the foregoing examples of functions are provided for illustrative purposes and are not intended to be an exclusive list of functions supported by the artifact generation engine. For instance, additional functions may be supported by the artifact generation engine through the use of plugins.

The system as described herein confers a number of technological advantages over conventional artifact generation methods. In particular, using the automated parameter initialization and variable generation processes as described herein, the system may efficiently and automatically generate artifacts that may be used in numerous different environments (e.g., production environment, testing environment, and the like) in a manner that is not possible by manual means. Furthermore, the modularity associated with incorporating code, parameters, and variables from external plugins provides a way to add extended functionality to the core artifact generation engine, which in turn provides a significant flexibility advantage in generating artifacts.

Turning now to the figures, FIG. 1 illustrates an operating environment 100 for the artifact generation system, in accordance with one embodiment of the present disclosure. In particular, FIG. 1 illustrates an artifact generation computing system 101 that is operatively coupled, via a network, to a source database computing system 102 and/or a target database computing system 103. In such a configuration, the artifact generation computing system 101 may transmit information to and/or receive information from the source database computing system 102 and/or the target database computing system 103. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a single source database computing system 102, the operating environment 100 may comprise multiple source database computing systems within the network environment. It should also be understood that one or more functions of the systems, devices, or servers as depicted in FIG. 1 may be combined into a single system, device, or server. For instance, in some embodiments, the source database computing system 102 and the target database computing system 103 may be the same computing system. Furthermore, a single system, device, or server as depicted in FIG. 1 may represent multiple systems, devices, or servers. For instance, though the artifact generation computing system 101 is depicted as a single unit, the functions of the artifact generation computing system 101 may be executed in a distributed manner across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the artifact generation computing system 101 may be a computing device that may perform the parameter initialization, variable generation, and artifact generation functions as described elsewhere herein. Accordingly, the artifact generation computing system 101 may be a device such as server or networked terminal, though it is within the scope of the disclosure for the artifact generation computing system 101 to be a desktop computer, laptop, IoT device, smartphone, tablet, single-board computer, or the like. In some embodiments, a user 104 may operate the artifact generation computing system 101 to specify artifacts to be generated, initiate the artifact generation process, or the like. In this regard, the artifact generation computing system 101 may comprise a user interface comprising one or more input devices (e.g., a keyboard, keypad, microphone, mouse, tracking device, biometric readers, capacitive sensors, or the like) for receiving input from the user 104 and/or output devices (e.g., a display such as a monitor, projector, headset, touchscreen, and/or auditory output devices such as speakers, headphones, or the like) for providing outputs to the user 104.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 of the artifact generation computing system 101 may use the communication device 112 to communicate with the network and other devices on the network, such as, but not limited to the source database computing system 102 and/or the target database computing system 103. The communication device 112 generally comprises a modem, antennae, WiFi or Ethernet adapter, radio transceiver, or other device for communicating with other devices on the network.

The computer-readable instructions 120 may comprise an artifact generation engine 122, which may comprise computer-executable program code which may instruct the processing device 114 to perform certain logic, data processing, and data storing functions of the application to accomplish the entity's objectives. For instance, the artifact generation engine 122 may read information from the source database computing system 102 (e.g., table data and/or metadata, running jobs, and the like), execute the artifact generation process, and transmit the outputs of the artifact generation process to the target database computing system 103 for storage. In some embodiments, the artifact generation engine 122 may be configured to read commands from a command line (e.g., commands inputted by the user 104 into an interface of the artifact generation computing system 101).

In some embodiments, the memory device 116 includes data storage 118 for storing data related to the system environment. In this regard, the data storage 118 may comprise an artifact data store 124. The artifact data store 124 may comprise the various types of data and/or metadata used by the artifact generation engine 122 to execute the artifact generation process. Accordingly, the artifact data store 124 may comprise properties files, configuration files, plugin data, template files, schemes, and the like. It should be understood that in some embodiments, the foregoing types of data may be additionally or alternatively stored within the source database computing system 102 and/or the target database computing system 103.

As further illustrated in FIG. 1, the operating environment 100 may further comprise a source database computing system 102 in operative communication with the artifact generation computing system 101. The source database computing system 102 may be, for instance, a server hosting one or more tables along with their associated data and/or metadata, which in turn may be used to generate one or more artifacts through the artifact generation engine 122. Accordingly, the source database computing system 102 may comprise a processing device 134 operatively coupled to a communication device 132 and a memory device 136 having data storage 138 and computer readable instructions 140 stored thereon.

The data storage 138 of the source database computing system 102 may comprise a source database 144. The source database 144 may comprise one or more tables containing data to be migrated to a target destination (e.g., the target database computing system 103). Accordingly, the artifact generation computing system 101 may read table data (e.g., the data stored within the tables, such as job data) along with table metadata (e.g., column names, column types, table descriptions, table structure, and the like), to generate artifacts.

As further illustrated in FIG. 1, the operating environment 100 may further comprise a target database computing system 103 in operative communication with the artifact generation computing system 101. The target database computing system 103 may be, for instance, a server which may be the storage location of artifacts generated by the artifact generation engine 122. Accordingly, the target database computing system 103 may comprise a processing device 154 operatively coupled to a communication device 152 and a memory device 156 having data storage 158 and computer readable instructions 160 stored thereon. It should be understood that in some embodiments, the target database computing system 103 may be the source database computing system 102 (e.g., the final outputs of the artifact generation process may be stored within the source database computing system 102).

The data storage 158 of the target database computing system 103 may comprise a target database 164. The target database 164 may comprise one or more tables in which the artifacts generated by the artifact generation engine 122 may be stored. Accordingly, the artifact generation engine 122 may be configured to transfer the outputs of the artifact generation process to the target database 164 of the target database computing system 103.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively, or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for automatically generating artifacts, in accordance with some embodiments. The process begins at block 201, where the system executes a parameter initialization process. The parameter initialization process may read various types of input files to define the parameters to be used in the artifact generation process. In this regard, in one embodiment, the parameter initialization process may comprise 1) reading one or more parameters from one or more properties files; and 2) generating a parameter list comprising the one or more parameters. The properties files may include parameters defined by one or more applications from within the network environment and/or preset system parameters (e.g., from configuration files). The configuration files may contain one or more parameters to be processed by the parameter engine. In this regard, different configuration files may be used depending on the type of artifact to be generated. For instance, different types of artifacts may be generated based on the type of environment into which the artifact is to be deployed. In this regard, the system may be configured to select a configuration file associated with the target environment (e.g., a production environment, user acceptance testing environment, or the like). Additional parameters may further be processed by defining the parameters in a command line entry.

In some embodiments, certain parameters may be a core part of the artifact generation engine. In such scenarios, the parameters may be defined using specific values as enumerated in the properties file. In other embodiments, a parameter's value may be linked to a specific variable. In such scenarios, the parameter may be defined using a variable name associated with the variable with which the parameter is to be associated. In yet other embodiments, certain parameters may be defined by plugins. In this regard, each plugin may comprise readable code that may be processed to initialize additional parameters.

The process continues to block 202, where the system executes a parameter-based variable generation process comprising, based on the one or more parameters within the parameter list, generating a variable pool comprising one or more variables associated with the one or more parameters and one or more values associated with the one or more variables. At this stage, the system may generate a list of variables from the various parameters initialized in the previous step (e.g., by reading command line parameters and/or configuration files). If a parameter is associated with a variable, the system may add the value to the variable pool.

The process continues to block 203, where the system executes a plugin-based variable generation process. At this stage, the system may load each plugin such that each plugin may define its own sets of variables. Accordingly, the plugin-based variable generation process may comprise 1) loading one or more plugins into the memory, the one or more plugins comprising one or more plugin variables; and 2) appending the one or more plugin variables to the variable pool. In an exemplary embodiment, the system may load a "database" plugin which may define variables associated with the particular database and/or environment from which the resources are to be created. In this regard, the database plugin may define variables such as a table name, table description, column descriptions, column types, information security classifications, and the like.

The process concludes at block 204, where the system, based on the parameter list and variable pool, initiates an artifact generation process. At this stage, the system may process each template file within a scheme folder and/or its subfolders and replace the variable names in each template file with the values associated with the variable name as identified in the variable pool. The artifact generation engine may read a template file line-by-line to process the code defined therein. In this regard, the template file may contain conditional statements and/or operators, function calls, and the like. Accordingly, the artifact generation process may comprise 1) loading a template file into the memory; 2) detecting one or more variable names within the template file; 3) correlating the one or more variable names with the one or more variables in the variable pool; 4) replacing the one or more variable names with the one or more values associated with the one or more variables; and 5) generating an artifact based on the template file. The artifact files may be generated in a manner that is appropriate for the environment in which the artifact files are to be stored. For example, the artifact files may be output in a "flat configuration" such that the artifact files are stored within a single directory. In other embodiments, the artifact files may be stored according to the same directory structure as was used in the scheme. In this manner, the system may provide an extensible, expedient, and consistent manner to generate artifacts.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automatically generating electronic artifacts using extended functionality, the system comprising:
   at least one processing device;
   a communication device; and
   at least one non-transitory storage device with computer-readable program code stored thereon and accessible by the at least one processing device, wherein the computer-readable code when executed is configured to cause the at least one processing device to
      execute a parameter initialization process, the parameter initialization process comprising:
         reading one or more parameters from one or more properties files, wherein the one or more properties files comprises parameter definitions and parameter descriptions; and
         generating a parameter list comprising the one or more parameters;
      execute a parameter-based variable generation process, the parameter-based variable generation process comprising, based on the one or more parameters within the parameter list, generating a variable pool comprising one or more variables associated with the one or more parameters and one or more values associated with the one or more variables;
      execute a plugin-based variable generation process, the plugin-based variable generation process comprising:
         loading one or more plugins into the memory device;
         appending one or more plugin parameters to the parameter list, wherein the one or more plugin parameters direct generation of one or more plugin variables;
         appending the one or more plugin variables to the variable pool; and
      based on the parameter list and variable pool, initiate an artifact generation process, wherein the artifact generation process comprises:
         loading a template file into the memory device;
         detecting one or more variable names within the template file;
         correlating the one or more variables names with the one or more variables in the variable pool;
         replacing the one or more variable names within the template file with the one or more values associated with the one or more variables, wherein replacing the one or more variable names within the template file with the one or more values associated with the one or more variables further comprises;
         detecting that the template file comprises an iterate operator associated with an index for one or more list variables, wherein each of the one or more list variables comprises a plurality of values, wherein the iterate operator specifies an nth position within each of the one or more list variables;
         based on detecting the iterate operator, iterate through the plurality of values of each of the list variables based on the nth position of each of the one or more list variables; and
         selecting an nth value within each of the list variables for variable substitution;
         initiating an artifact generation process based on the template file;
         detecting that a required variable does not have an associated value; and
         terminating the artifact generation process.

2. The system according to claim 1, wherein the artifact generation process comprises execution of computer-readable code by the at least one processing device for: 1) generating the artifact according to a first set of code upon detecting that a first user has initiated the artifact generation process; and 2) generating the artifact according to a second set of code upon detecting that a second user has initiated the artifact generation process.

3. The system according to claim 1, wherein the parameter initialization process further comprises execution of computer-readable code by the at least one processing device for:
   reading one or more command line parameters from a command line; and
   at least one of:
      appending the one or more command line parameters to the parameter list;
      populating one or more variable values;
      loading one or more plugins; or
      processing parameters from one or more configuration files.

4. The system according to claim 1, wherein the parameter initialization process further comprises execution of computer-readable code by the at least one processing device for:
   reading one or more preset system parameters from one or more configuration files; and
   at least one of:
      appending the one or more preset system parameters to the parameter list;
      populating one or more variable values;
      loading one or more plugins; or
      processing parameters from one or more configuration files.

5. The system according to claim 1, wherein the parameter-based variable generation process comprises execution of computer-readable code by the at least one processing device for:
   detecting an unset value for a variable of the one or more variables; and
   removing the variable and one or more values associated with the variable from the variable pool.

6. The system according to claim 1, wherein the parameter-based variable generation process comprises execution of computer-readable code by the at least one processing device for:
   detecting conditional logic within a template file; and
   generate an artifact according to the conditional logic.

7. The system according to claim 1, wherein the one or more variables comprises at least one of a table name, table description, column descriptions, and column types.

8. A computer program product for automatically generating electronic artifacts using extended functionality, the computer program product comprising at least one non-transitory computer readable medium having computer-readable program code portions embodied therein, the computer-readable program code portions comprising executable code portions for:
   executing a parameter initialization process, the parameter initialization process comprising:

reading one or more parameters from one or more properties files, wherein the one or more properties files comprises parameter definitions and parameter descriptions; and generating a parameter list comprising the one or more parameters;

executing a parameter-based variable generation process, the parameter-based variable generation process comprising, based on the one or more parameters within the parameter list, generating a variable pool comprising one or more variables associated with the one or more parameters and one or more values associated with the one or more variables;

executing a plugin-based variable generation process, the plugin-based variable generation process comprising:
loading one or more plugins into a memory device;
appending one or more plugin parameters to the parameter list, wherein the one or more plugin parameters direct generation of one or more plugin variables;
appending the one or more plugin variables to the variable pool; and
based on the parameter list and variable pool, initiating an artifact generation process, wherein the artifact generation process comprises:
loading a template file into the memory device;
detecting one or more variable names within the template file;
correlating the one or more variables names with the one or more variables in the variable pool;
replacing the one or more variable names within the template file with the one or more values associated with the one or more variables, wherein replacing the one or more variable names within the template file with the one or more values associated with the one or more variables further comprises:
detecting that the template file comprises an iterate operator associated with an index for one or more list variables, wherein each of the one or more list variables comprises a plurality of values, wherein the iterate operator specifies an nth position within each of the one or more list variables;
based on detecting the iterate operator, iterate through the plurality of values of each of the list variables based on the nth position of each of the one or more list variables; and
selecting an nth value within each of the list variables for variable substitution;
initiating an artifact generation process based on the template file;
detecting that a required variable does not have an associated value; and
terminating the artifact generation process.

9. The computer program product according to claim 8, wherein the artifact generation process comprises: 1) generating the artifact according to a first set of code upon detecting that a first user has initiated the artifact generation process; and 2) generating the artifact according to a second set of code upon detecting that a second user has initiated the artifact generation process.

10. The computer program product according to claim 8, wherein the parameter initialization process further comprises:
reading one or more command line parameters from a command line; and at least one of:
appending the one or more command line parameters to the parameter list;
populating one or more variable values;
loading one or more plugins; or
processing parameters from one or more configuration files.

11. The computer program product according to claim 8, wherein the parameter initialization process further comprises:
reading one or more preset system parameters from one or more configuration files; and
at least one of:
appending the one or more preset system parameters to the parameter list;
populating one or more variable values;
loading one or more plugins; or
processing parameters from one or more configuration files.

12. The computer program product according to claim 8, wherein the parameter-based variable generation process comprises:
detecting an unset value for a variable of the one or more variables; and
removing the variable and one or more values associated with the variable from the variable pool.

13. The computer program product according to claim 8, wherein the parameter-based variable generation process comprises:
detecting conditional logic within a template file; and
generate an artifact according to the conditional logic.

14. A computer-implemented method for automatically generating electronic artifacts using extended functionality, wherein the computer-implemented method comprises:
executing a parameter initialization process, the parameter initialization process comprising:
reading one or more parameters from one or more properties files, wherein the one or more properties files comprises parameter definitions and parameter descriptions; and
generating a parameter list comprising the one or more parameters;
executing a parameter-based variable generation process, the parameter-based variable generation process comprising, based on the one or more parameters within the parameter list, generating a variable pool comprising one or more variables associated with the one or more parameters and one or more values associated with the one or more variables;
executing a plugin-based variable generation process, the plugin-based variable generation process comprising:
loading one or more plugins into a memory device;
appending one or more plugin parameters to the parameter list, wherein the one or more plugin parameters direct generation of one or more plugin variables;
appending the one or more plugin variables to the variable pool; and
based on the parameter list and variable pool, initiating an artifact generation process, wherein the artifact generation process comprises:
loading a template file into the memory device;
detecting one or more variable names within the template file;
correlating the one or more variables names with the one or more variables in the variable pool;
replacing the one or more variable names within the template file with the one or more values associated with the one or more variables, wherein replacing the one or more variable names within the template file with the one or more values associated with the one or more variables further comprises;
  detecting that the template file comprises an iterate operator associated with an index for one or more list variables, wherein each of the one or more list variables comprises a plurality of values, wherein the iterate operator specifies an nth position within each of the one or more list variables;
  based on detecting the iterate operator, iterate through the plurality of values of each of the list variables based on the nth position of each of the one or more list variables; and
  selecting an nth value within each of the list variables for variable substitution;
 initiating an artifact generation process based on the template file;
 detecting that a required variable does not have an associated value; and
 terminating the artifact generation process.

15. The computer-implemented method according to claim 14, wherein the artifact generation process comprises: 1) generating the artifact according to a first set of code upon detecting that a first user has initiated the artifact generation process; and 2) generating the artifact according to a second set of code upon detecting that a second user has initiated the artifact generation process.

16. The computer-implemented method according to claim 14, wherein the parameter initialization process further comprises:
 reading one or more command line parameters from a command line; and
 at least one of:
  appending the one or more command line parameters to the parameter list;
  populating one or more variable values;
  loading one or more plugins; or
  processing parameters from one or more configuration files.

17. The computer-implemented method according to claim 14, wherein the parameter initialization process further comprises:
 reading one or more preset system parameters from one or more configuration files; and
 at least one of:
  appending the one or more preset system parameters to the parameter list;
  populating one or more variable values;
  loading one or more plugins; or
 processing parameters from one or more configuration files.

18. The computer-implemented method according to claim 14, wherein the parameter-based variable generation process comprises:
 detecting an unset value for a variable of the one or more variables; and
 removing the variable and one or more values associated with the variable from the variable pool.

19. The computer-implemented method according to claim 14, wherein the parameter-based variable generation process comprises:
 detecting conditional logic within a template file; and
 generate an artifact according to the conditional logic.

20. The computer-implemented method according to claim 14, wherein the one or more variables comprises at least one of a table name, table description, column descriptions, and column types.

* * * * *